STYLUS-PROTECTING DEVICE

Filed July 30, 1949 2 SHEETS—SHEET 1

INVENTORS
JOSEPH A. RESCSANSKI
JOHN R. HOPKINS
BY Curtis, Morris & Safford
ATTORNEYS

STYLUS-PROTECTING DEVICE

Filed July 30, 1949

INVENTORS
JOSEPH A. RESCSANSKI
JOHN R. HOPKINS
BY
Curtis, Morris & Safford
ATTORNEYS Patented May 5, 1953 2,637,563

UNITED STATES PATENT OFFICE 2,637,563

STYLUS-PROTECTING DEVICE

Joseph A. Rescsanski and John Ronald Hopkins, Bridgeport, Conn., assignors to Dictaphone Corporation, Bridgeport, Conn., a corporation of New York Application July 30, 1949, Serial No. 107,796

2 Claims. (Cl. 274—25)

This invention relates to electro-mechanical translating units such as are used in sound recording and reproducing equipment, and more particularly to means for protecting the stylus in such an electro-mechanical translating unit from damage due to the application of excessive force, as when the translating device is lowered into operative position against the record medium, or due to the stylus being struck by the record medium when the latter is inserted into the machine.

The invention provides a protecting device pivotally supported on the translating head and having two downwardly projecting feet adapted to engage the record and take up the impact force when the translating head is moved into operating position, without interfering with the operative engagement of the stylus and record. The pivotal arrangement of the protecting device allows it to be swung gradually out of the way by the movement of the record, gently lowering the stylus into contact with the record. The protecting device is supported on the translating head at two pivotal points, at least one of which is vertically adjustable to allow alignment of the two record-contacting feet so that they will touch the record exactly simultaneously when the device is lowered into operating position. The two feet are spaced at either side of the needle in the general line of movement of the record during insertion into the machine, so that they protect the stylus from being struck by the leading edge of the record as it is inserted. The lower ends of the contact feet are formed with inclined surfaces so as to direct the leading edge of the record downwardly below the stylus, if the record should strike the feet during insertion.

Figure 1:
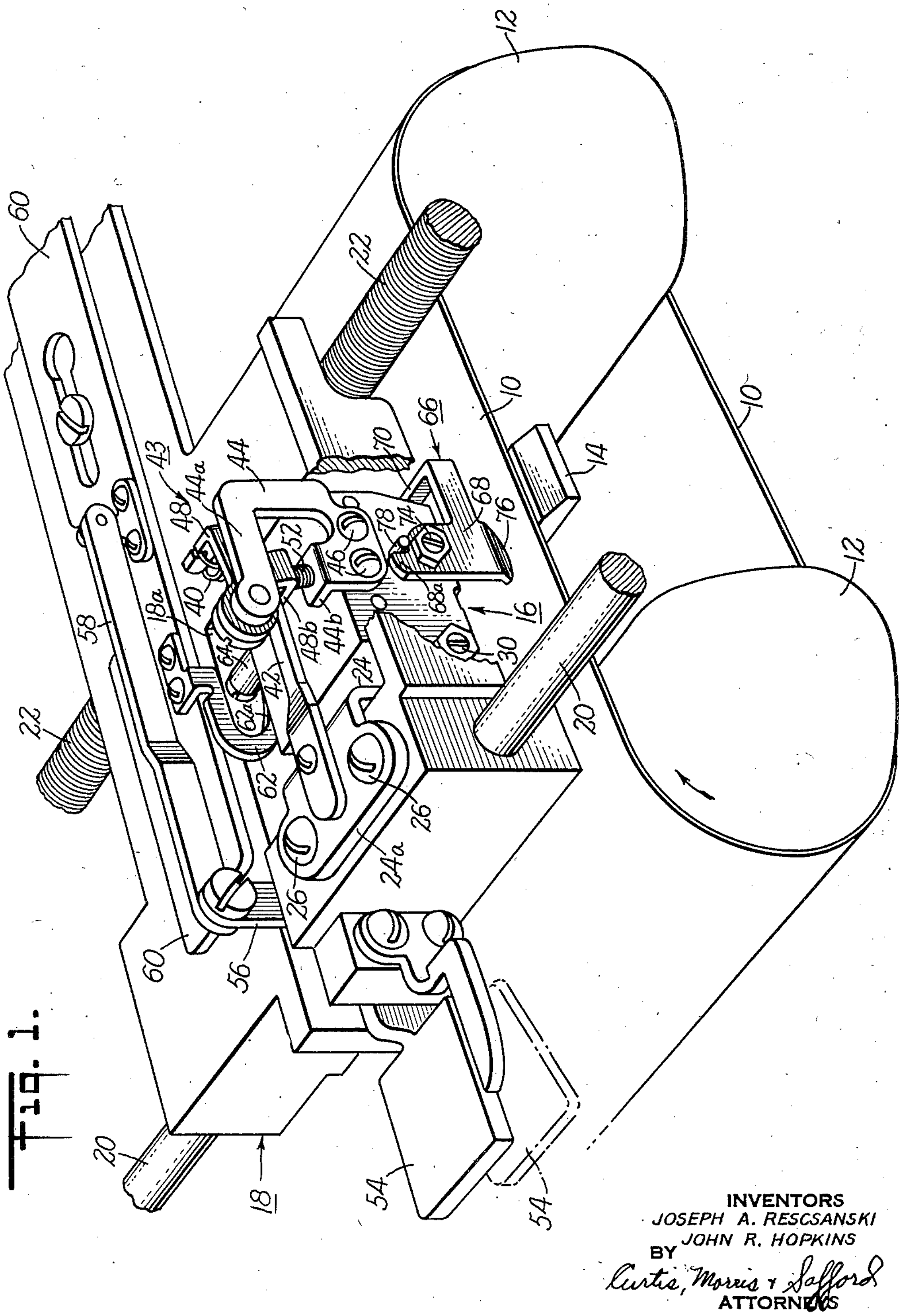
Figure 1 is a fragmentary perspective view of a dictating machine including a recording head having a stylus-protecting device embodying features of the present invention.

The invention is shown as applied to a sound recording machine of the type commonly used in offices for the recording of dictation, wherein the record medium is in the form of a flexible plastic belt 10 (see Figure 1). The record belt 10 is supported in the dictating machine on a pair of parallel cylindrical mandrels 12 which are rotated in a clockwise direction, as viewed in Figure 1, to drive the belt relative to the recording stylus to form on the belt a continuous helical record groove or sound track. A recording head, generally indicated at 16, is supported for movement laterally of the dictating machine on a carriage, generally indicated at 18. The carriage 18 is slidably supported at its forward side upon a guide rod 20, and is supported and threadedly engaged at its rearward side by a lead screw 22 which extends across the machine parallel to the rod 20. The lead screw 22 is rotated to cause the carriage 18 to traverse the record belt 10.

An anvil 14 extends beneath the upper portion of the record belt and supports the flexible record belt beneath the stylus of the recording head 16.

Figure 2:
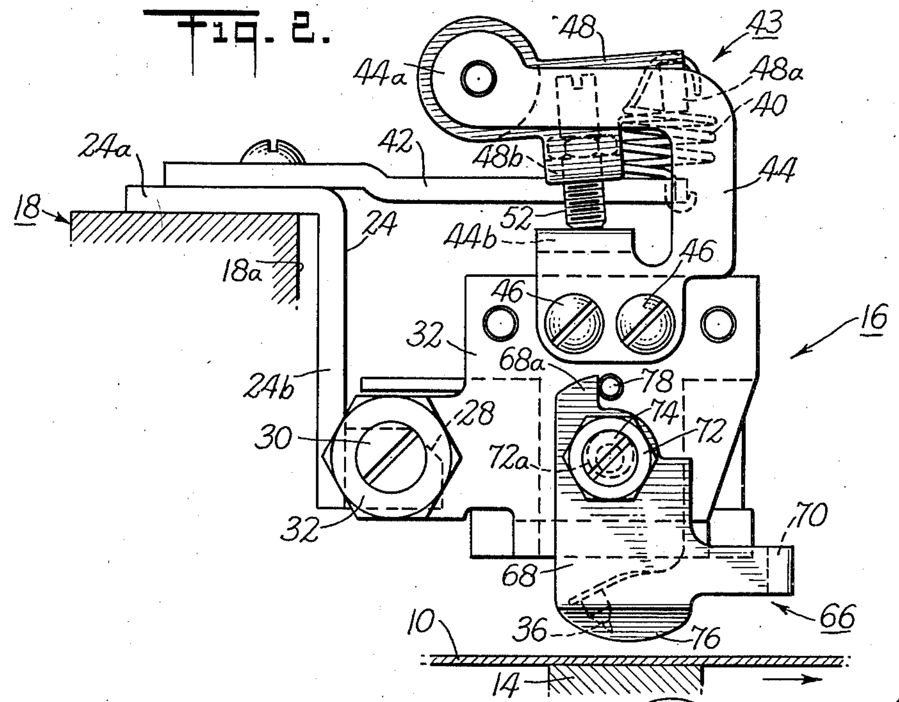
Figure 2 is an enlarged side elevational view of the recording head of Figure 1, the head being shown in the upper or non-recording position.

The recording head 16 is pivotally mounted in an opening 18a in the carriage 18 by means of a bracket 24 (see Figure 2). The bracket 24 has a horizontal upper portion 24a, which is secured to the carriage 18 by means of screws 26, and a vertical lower portion 24b which extends downwardly into the opening 18a. At the lower end of the portion 24b of the bracket 24 there is secured a bearing block 28, having at either end conical recesses which are pivotally engaged by the pointed ends of pivot screws 30 threaded through the side plates 32 of the recording head and fixed in position to allow proper pivoting of the recording head by locking nuts 34.

Figures 3, 4:
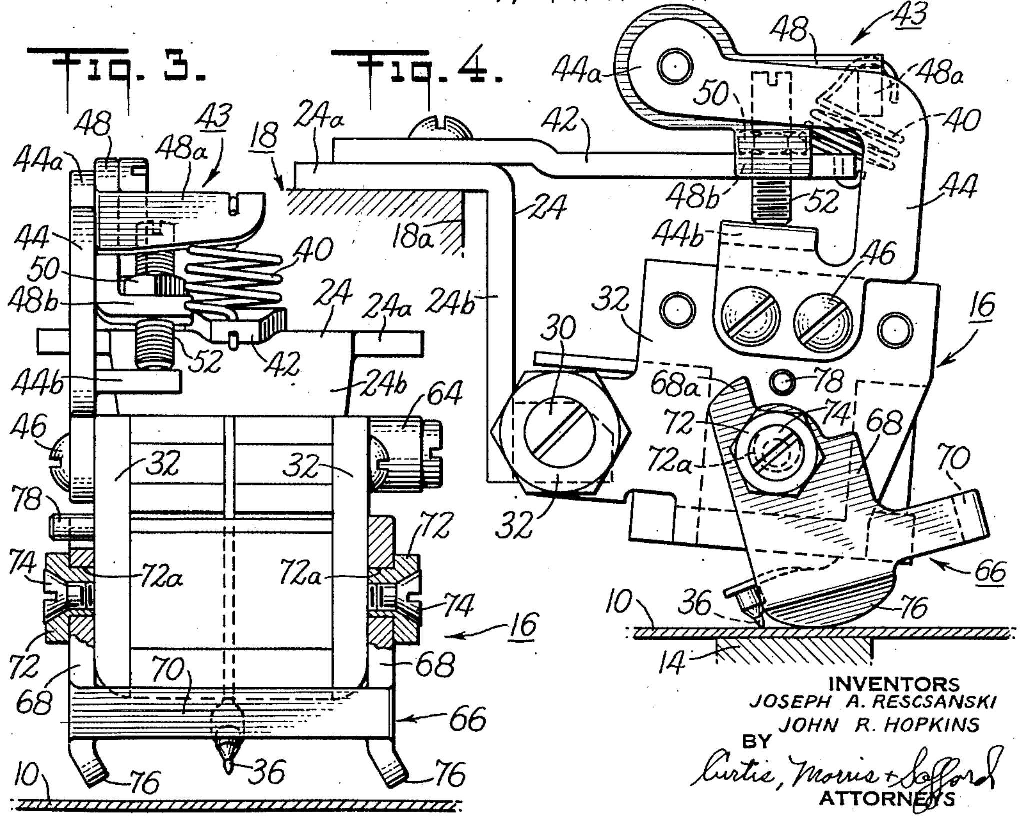
Figure 3 is a front elevational view of the recording head of Figure 2, likewise shown in the upper or non-recording position, with a portion of the device being broken away to illustrate the detail of mounting of the stylus-protecting device.
Figure 4 is a view corresponding to Figure 2, but with the head shown in the lower or recording position.

Since the center of gravity of the recording head 16, as viewed in Figure 2, is substantially to the right of its pivotal axis through the screws 30, the device is urged by gravity to rotate in a clockwise direction about this axis, which tends to move it downwardly into the position shown in Figure 4, in which the stylus 36 contacts the record 10.

Additionally, a spring 40 is provided to bias the recording head 16 toward the record 10. The lower end of the spring 40 is secured to a fixed arm 42 which extends rearwardly and horizontally from the bracket 24, while its upper end engages an arm assembly generally indicated at 43, which extends upwardly from the recording head 16. The tension of the spring 40 urges the arm assembly 43 and with it the recording head 16 downwardly to bring the stylus 36 into contact with the record 10.

In order to provide adjustment of the tension of the spring 40 and thereby allow variation of the effective pressure of the stylus 36 against the record 10, the arm assembly 43 is divided into two relatively movable parts. One of these, a fixed arm 44, is secured to one side plate 32 of the recording head by screws 46. This arm extends upwardly and forwardly and its end, at 44a, pivotally supports the other part of the arm assembly 43, a lever 48. The lever 48 extends rearwardly and inwardly to engage the upper end of the spring 40. The spring 40 thus urges the lever 48 in a clockwise direction, as viewed in Figure 2, about the pivot 44a.

This force is transmitted from the lever 48 to the arm 44 and the recording head through a set screw 52 which is threaded through a flange 48b on lever 48 and extends downwardly to engage a flange 44b on arm 44. The adjustment of the set screw 52 determines the position of lever 48 relative to arm 44 and accordingly the tension of spring 40 and the pressure of the stylus 36 against the record 10. A locking nut 50 is provided to hold the set screw 52 in the desired position.

The recording head 16 may be vertically moved to place it in either recording or non-recording position. As shown in Figure 1, a control lever 54 is pivotally mounted on the front of the carriage 18 and is provided with an integral upwardly extending arm 56. The upper end of the arm 56 is connected by means of a link 58 to a plate 60 which is slidably mounted on top of the carriage 18. The plate 60 has a fixed hook 62 which extends downwardly into the opening 18a in the carriage in position to engage a roller 64 (see also Figure 3) which extends from and is rotatably mounted upon one of the side plates 32 of the translating device. When control lever 54 is moved upwardly from the dotted-line to the full-line position shown in Figure 1, arm 56 is moved to the right. This motion, transmitted through link 58 to plate 60 and hook 62, results in a movement of hook 62 to the right, causing it to engage roller 64 so that the inclined surface 62a of the hook raises the roller 64 and the recording head about its pivotal axis through pivot screws 30 against its own weight and the tension of bias spring 40. This moves the stylus 36 out of contact with the record 10 in an upper non-recording position.

Movement of lever 54 to the position shown in dotted lines in Figure 1 causes hook 62 to clear roller 64 and allow the recording head, urged by its weight and the tension of spring 40, to fall into the recording position, as shown in Figure 4, wherein the stylus is in contact with the record 10.

In order to protect the stylus and the record surface from damage when the recording head 16 drops into recording position, the present invention provides a protecting device, generally indicated at 66. As shown in Figures 2 and 3, the protecting device 66 comprises a pair of side portions 68 extending generally vertically at either side of the recording head 16 with a central bail portion 70 extending therearound to interconnect the two side portions 68. The protecting device is pivotally mounted on the recording head by means of bearings 72, each having a cylindrical bearing surface 72a and each being received through a cylindrical opening adjacent the uper end of one of the side feet 68. The bearings 72 are suported on the side plates 32 of the recording head 16 by means of screws 74. As may be seen in Figure 3, the cylindrical bearing surfaces 72a of the bearings 72 are eccentric with respect to the screws 74; thus, when the screws 74 are loosened and the bearings 72 are rotated, the effective vertical positions of the bearing surfaces 72a may be adjusted to raise or lower their respective sides of the protecting device for aligning their two lower ends or contact feet 76 parallel to the surface of the record 10 and just below the lower end or point of the stylus 36. When the protecting device is so adjusted, the two contact feet 76 will engage the record 10 simultaneously when the recording head is lowered into recording position. Thus, all of the weight of the recording will not be concentrated upon one of the feet 76 with possible damage to the recording surface, or with the imposition of repeated rotational movement to the translating device, which might eventually loosen its mounting and allow spurious vibration of the stylus relative to the record.

As may be seen in Figure 2, the center of gravity of the protecting device is considerably to the right of the pivotal axis of the device on the bearing 72, so that the device is urged by gravity to rotate in a clockwise direction about its axis. This tendency is limited by means of a stop pin 78 projecting from one of the side plates 32 of the recording head 16 into engagement with an extension 68a at the upper end of one of the side portions 68 of the protecting device 66. The stop pin 78 is so located that the protecting device is normally positioned with its side portions 68 generally vertical and with the contact foot 76 at the lower end of each of the side portions 68 directly below the pivotal axis of the protecting foot; thus, contact of the feet 76 with the record 10 will not tend to rotate the protecting device, but the full force of impact of the feet 76 with the record medium 10 will be taken up by the protecting device and the protecting device will maintain the stylus 36, at least momentarily, out of contact with the record 10. If the record 10 is moving (i. e., being driven by the mandrels 12, as previously described) at the time the recording head is lowered into recording position, or when the belt is subsequently started into movement, friction between the contact feet 76 and the record 10 will be sufficient to move the contact feet 76 in the direction of the movement of the record 10, as indicated by the arrow in Figure 2, rotating the protecting device 66 about its pivotal axis to the position shown in Figure 4; this will result in gently lowering the stylus 36 into contact with the record 10 as shown in Figure 4.

The bearings 72 of the protecting device 66 are normally so adjusted that the contact feet 76 are very closely spaced (e. g., 0.010″) below the point of the stylus 36, to minimize the distance of travel of the recording head from the position at which the feet 76 make contact with the record belt to the position at which the stylus 36 makes contact with the record. This reduces the force of impact of the stylus against the record belt below the level at which there is any appreciable danger of injury to either the stylus or the record surface.

The record belt 10 is inserted into and removed from the machine by sliding it longitudinally of the mandrels 12. In most such machines, there is provided an inserting and removing mechanism which engages and forcibly moves the record belt 10 with respect to the mandrels 12. When such a mechanism is provided, the movement of the record 10 during injection or ejections may be very rapid and forceful. Heretofore, this has involved a danger to the stylus in that the leading edge of the record might strike the stylus and bend its mounting or loosen or fracture the semi-precious stone of which such styli are customarily composed. The present invention affords effective protection against this hazard. The record should be and customarily is inserted into and removed from the machine while the recording head is in non-recording position, as illustrated in Figures 2 and 3. As previously described, in this position of the recording head the contact feet 76 of the protecting device are below the stylus 36. The contact foot 76 on the side of the stylus from which the record is inserted thus stands in the way of the leading edge of the record to prevent its striking the stylus 36 during insertion. The sides of the contact feet 76 are formed as shown in Figure 3 to provide surfaces which are inclined downwardly in the direction of insertion of the record so as to guide the leading edge of the record downwardly below the contact feet 76 and the stylus 36.

It will thus be seen that the present invention provides means for eliminating several causes of difficulty heretofore present in sound recording machines. It should be emphasized, however, that the particular embodiment shown and described is intended as merely illustrative and in no way restrictive of the invention.

We claim:

1. In an electro-mechanical translating head of the type including a stylus adapted for cooperation with an impressible record, stylus protecting means comprising in combination; an element, having two downwardly projecting side portions, pivotally supported adjacent the upper end thereof at two spaced pivots on said translating head to move about a pivotal axis generally parallel to the surface of said record; and each portion having at its lower end a rounded contact foot adapted for engagement with said record; said element also having a central bail portion extending around said translating device and joining said side portions; and said pivots being arranged for eccentric rotation whereby one of said contact feet may be raised and lowered relative to the other for alignment therewith parallel to the surface of said record.

2. In a sound recording-reproducing machine having an electro-mechanical translating device, including a stylus adapted for engagement with and removal from record elements insertable into and removable from said machine only in an edgewise manner perpendicular to the direction of relative motion between said stylus and said record elements during translating operation stylus protecting means comprising, an element having at least one downwardly projecting contact portion adapted for engagement with said record elements at a point spaced from said stylus in the direction from which said record elements are inserted, said contact portion being formed at its lower end to present a first surface inclined downwardly in the direction of movement of said record elements during translating operation and a second surface inclined downwardly in the direction of movement of said record elements during insertion.

JOSEPH A. RESCSANSKI.
JOHN RONALD HOPKINS.

References Cited in the file of this patent

UNITED STATES PATENTS

| Number | Name | Date |
|---|---|---|
| 1,872,672 | Capps | Aug. 23, 1932 |
| 2,259,275 | Stone | Oct. 14, 1941 |
| 2,318,828 | Yerkovich | May 11, 1943 |
| 2,327,094 | Catucci | Aug. 17, 1943 |
| 2,410,607 | Moore | Nov. 5, 1946 |
| 2,418,617 | Bessire | Apr. 8, 1947 |
| 2,491,215 | Roys | Dec. 13, 1949 |
| 2,513,441 | Allen | July 4, 1950 |